United States Patent [19]
Jun

[11] Patent Number: 5,987,366
[45] Date of Patent: Nov. 16, 1999

[54] DAMPING CONTROL DEVICE FOR A STABILIZER BAR

[75] Inventor: Yong-Won Jun, Kyungki-do, Rep. of Korea

[73] Assignee: Hyundai Motor Company, Rep. of Korea

[21] Appl. No.: 08/777,300

[22] Filed: Dec. 27, 1996

[30] Foreign Application Priority Data

Dec. 27, 1995 [KR] Rep. of Korea ........................ 95-58644

[51] Int. Cl.$^6$ ............................ B60G 11/32; B60G 17/00
[52] U.S. Cl. .................................. 701/37; 701/1; 701/38; 280/5.507; 280/124.106; 280/284; 180/190; 180/182; 188/378; 267/190
[58] Field of Search .................................. 701/1, 37, 38; 280/5.507, 124.106, 284; 267/190; 180/182, 190; 188/378

[56] References Cited

U.S. PATENT DOCUMENTS

| 5,004,264 | 4/1991 | Kozaki et al. | 280/5.507 |
| 5,137,299 | 8/1992 | Jones | 280/5.507 |
| 5,570,287 | 10/1996 | Campbell et al. | 280/5.507 |

*Primary Examiner*—William A. Cuchlinski, Jr.
*Assistant Examiner*—Olga Hernandez
*Attorney, Agent, or Firm*—Christie, Parker & Hale, LLP

[57] ABSTRACT

A damping control system for a stabilizer bar with an electronic shock absorber between a low arm and the stabilizer bar for controlling the rolling of the vehicle. Included are a potentiometer, a vehicle speed sensor, a steering angle sensor, an electronic control unit and a voltage amplifier.

1 Claim, 2 Drawing Sheets

DAMPING CONTROL DEVICE FOR A STABILIZER BAR

BACKGROUND OF THE INVENTION

A. Field of the Invention

The present invention relates to a damping control system for a stabilizer bar. More particularly, the present invention relates to a damping control system for a vehicle stabilizer bar to enhance ride comfort and handling safety by providing, a shock absorber between a low arm and a stabilizer bar and controlling the rolling strength of the stabilizer bar with the shock absorber.

B. Description of the Prior Art

Generally, a stabilizer bar, which is part of a suspension system, is mounted in a vehicle to prevent rolling of the vehicle, when the vehicle is moving. However, an automobile with a conventional stabilizer bar has a disadvantage in that ride comfort is not as good, as it should be when a vehicle is driven on level ground.

SUMMARY OF THE INVENTION

An object of the present invention is to provide a damping control system for a stabilizer bar which can enhance ride comfort and handling safety by making a shock absorber formed between a low arm and a stabilizer bar and controlling the rolling strength of the stabilizer bar by the shock absorber to substantially obviate one or more of the problems due to limitations and disadvantages of the prior art.

To achieve the objects, one embodiment of the invention is a damping control system for a vehicle for a stabilizer bar. An electronically controlled shock absorber is mounted to a low arm therebelow and supports an end portion of the stabilizer bar. The electronically controlled shock absorber applies a force corresponding to an applied voltage between the low arm and the stabilizer bar. A potentiometer, on the shock absorber, detects displacement due to the force supplied from the shock absorber. A vehicle speed sensor detects the speed of a vehicle. A steering angle sensor detects a steering angle of the vehicle. An electronic control unit receives as input signals, output signals from the vehicle speed sensor, the steering angle sensor and the potentiometer, and calculates lateral acceleration using the inputted signals from the vehicle speed sensor and the vehicle steering angle sensor, and for further calculating driving voltage using the calculated lateral acceleration and the input signal from the potentiometer which is representative of the displacement of the shock absorber. A voltage amplifier amplifies the driving voltage outputted from the electronic control unit and applies the amplified driving voltage to the control shock absorber.

In addition, it is preferable that the electronic control system sets the lateral acceleration to a constant value if said lateral acceleration is less than a predetermined value, and calculates the driving voltage using the obtained lateral acceleration according to said setting method.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, illustrate one embodiment of the invention and, together with the description, serve to explain the principles of the invention.

In the drawings.

DESCRIPTION OF THE PREFERRED EMBODIMENT

A damping control system for a stabilizer bar in accordance with, a preferred embodiment of the present invention is explained in detail with reference to the accompanying drawings.

Figure 1:
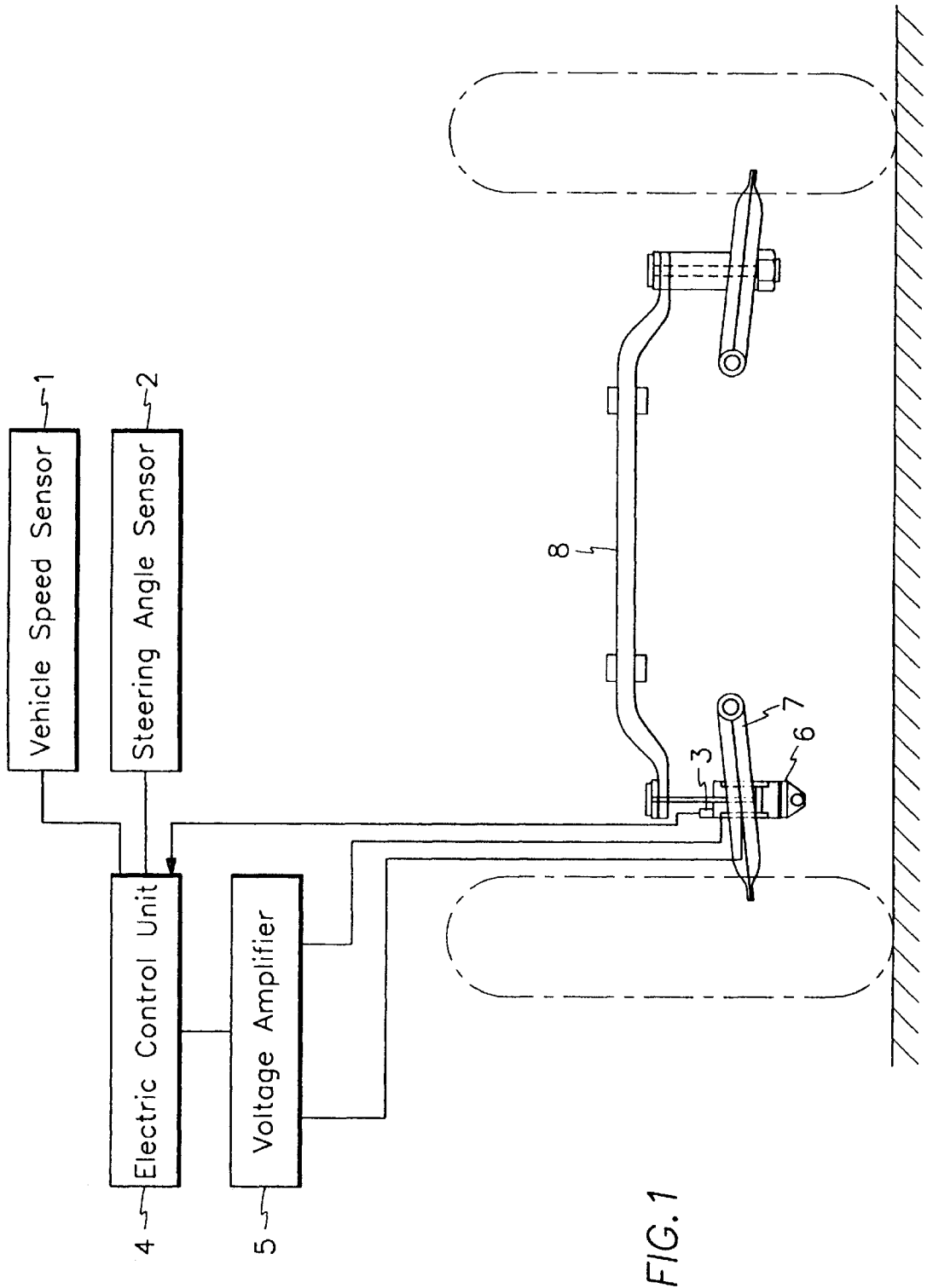
FIG. 1 is a block diagram illustrating a damping control system for a vehicle in accordance with a preferred embodiment of a present invention.

FIG. 1 shows a damping control system for a stabilizer bar 8. The control system includes an electronically controllable shock absorber 6 for supporting one end portion of a stabilizer bar 8 and is fixed to low arm 7 positioned therebelow. Also included are a potentiometer 3 mounted to the electronically controlled shock absorber 6, a vehicle speed sensor 1 and steering angle sensor 2. An electronic control unit 4 in the control system receives output signals from the vehicle speed sensor 1, the vehicle steering angle sensor 2 and the potentiometer 3. A voltage amplifier 5 receives an output signal from the electronic control unit 4 and outputs the amplified voltage to the electronically controlled, shock absorber 6.

Figure 2:
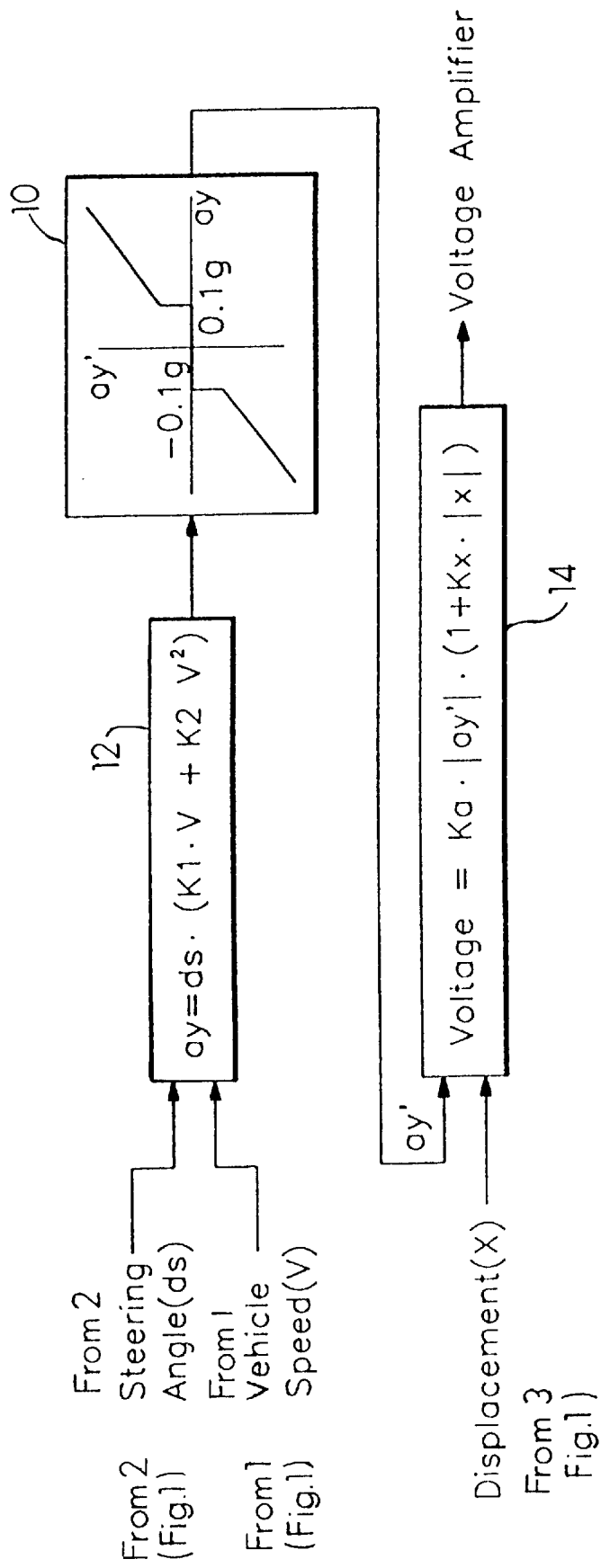
FIG. 2 is a block diagram illustrating a control operation carried out by an electronic control unit in FIG. 1.

Referring now to FIGS. 1 and 2 which depict the operation of the damping control device for a stabilizer bar in accordance with a preferred embodiment of the present invention.

When power is applied thereto by a dry battery (not shown), the damping control device for the stabilizer bar starts to operate.

The vehicle speed sensor 1 detects the vehicle speed, vehicle steering angle sensor 2 detects vehicle steering angle, and the potentiometer 3 detects the displacement x of the shock absorber 6. The output signals from the vehicle speed sensor 1, the steering angle sensor 2 and the potentiometer 3 are inputted to the electronic control unit 4.

The electronic control unit 4 produces voltage for driving the electronic shock absorber, using the inputted vehicle speed, the steering angle and the displacement of the shock absorbers 6 as indicated by potentiometer 3. This is explained in detail hereinafter with reference to FIG. 2.

Referring to FIG. 2, lateral acceleration ay is calculated, using the vehicle speed V and the steering angle ds. The lateral acceleration represents acceleration produced to the left or to the right of the vehicle; the lateral acceleration is defined as $$ay = ds \cdot (K1 \cdot V + K2 \cdot V^2)$$

Here, K1 and K2 are constants. A unit of the lateral acceleration ay is measured in terms of gravitational acceleration g.

When lateral acceleration is above 0.1 g in either a left or right direction, the voltage applied to amplifier 5 is computed in accordance with the equations 12 and 14 of FIG. 2. If, however, the calculation of the lateral acceleration ay is less than an absolute value of 0.1 g, the lateral acceleration value is set to a constant value of 0.1 g and a modified lateral acceleration ay' is determined. That is, assume that the vehicle or automobile driving on level ground when the automobile drives during, a time period in which the lateral acceleration ay is less than the absolute value of 0.1 g. During this time period, damping control of the shock absorber is not performed.

Driving voltage applied by control unit 4 to amplifier 5 is calculated using the modified lateral acceleration ay' and a displacement signal (x) is inputted from the potentiometer 3. The driving voltage to amplifier 5 is then defined as $$\text{Voltage} = Ka \cdot |ay'| \cdot (1 + Kx \cdot |x|)$$

where, Ka and Kx are constants.

The driving voltage is input to the voltage amplifier 5, and the voltage amplifier 5 amplifies the inputted driving voltage to a predetermined level. The voltage amplified by the voltage amplifier 5 is applied to the electronically controlled shock absorber 6, and the shock absorber 6 applies a force corresponding to the driving voltage between the stabilizer bar 8 and the low arm 7.

As described above, ride comfort and handling safety are enhanced in the disclosed embodiment of the present invention since the lateral acceleration ay becomes zero, whereby the shock absorber 6 does not operate when only one wheel of the automobile hits a bump or the automobile is driven on level ground. In addition, rolling is prevented by the stabilizer bar since the shock absorber operates when a vehicle is moving.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A damping control system for a vehicle, comprising:

a stabilizing bar;

a low arm;

an electronically controlled shock absorber mounted to the low arm for supporting an end portion of the stabilizer bar and for further applying a force corresponding to an applied driving voltage between the low arm and the stabilizer bar;

a potentiometer for detecting displacement of the shock absorber due to the force supplied from the shock absorber;

a vehicle speed sensor for detecting the speed of a vehicle;

a vehicle steering angle sensor for detecting a steering angle of the vehicle;

an electronic control unit for receiving, as input signals, output signals from the vehicle speed sensor, the steering angle sensor and the potentiometer, and for calculating lateral acceleration using the inputted signals from the vehicle speed sensor and the vehicle steering angle sensor, said electronic control unit comprising means for setting the lateral acceleration to a constant value if said calculated lateral acceleration is less than a predetermined value, and means for calculating driving voltage using the calculated lateral acceleration and the inputted signal from the potentiometer which is representative of the displacement of the shock absorber; and a voltage amplifier for amplifying the driving voltage outputted from the electronic control unit and applying the amplified driving voltage to the shock absorber.

* * * * *